(12) United States Patent
Gille et al.

(10) Patent No.: US 6,805,636 B2
(45) Date of Patent: Oct. 19, 2004

(54) JOINT YOKE AND UNIVERSAL JOINT COMPRISING THE SAME

(75) Inventors: Wilfried Gille, Dorsten (DE); Walter Bischoff, Münster (DE)

(73) Assignee: Spicer Gelenkwellenbau GmbH & Co. KG, Essen (DE)

( * ) Notice: Subject to any disclaimer, the term of this patent is extended or adjusted under 35 U.S.C. 154(b) by 0 days.

(21) Appl. No.: 10/413,416

(22) Filed: Apr. 14, 2003

(65) Prior Publication Data

US 2003/0228921 A1 Dec. 11, 2003

(30) Foreign Application Priority Data

Apr. 15, 2002 (DE) .......................................... 102 16 656

(51) Int. Cl.$^7$ ................................................ F16D 3/40
(52) U.S. Cl. ....................................................... 464/135
(58) Field of Search ................................ 464/130, 134, 464/135; 411/84; 285/368; 384/295, 542, 579

(56) References Cited

U.S. PATENT DOCUMENTS

| | | | |
|---|---|---|---|
| 2,300,658 A | * | 11/1942 | Dunn ....................... 464/130 X |
| 3,423,958 A | | 1/1969 | Koelling |
| 4,463,489 A | * | 8/1984 | James |
| 4,637,807 A | * | 1/1987 | Koelling, Sr. ................ 464/135 |
| D358,910 S | * | 5/1995 | Frasier ...................... 411/84 X |
| 5,647,799 A | | 7/1997 | Gall et al. |
| 5,909,920 A | * | 6/1999 | Dalinkiewicz ............ 411/84 X |
| 6,056,644 A | | 5/2000 | Lindenthal |
| 6,257,986 B1 | | 7/2001 | Duggan et al. |

FOREIGN PATENT DOCUMENTS

GB              705009         3/1954

* cited by examiner

Primary Examiner—Greg Binda
(74) Attorney, Agent, or Firm—MacMillan, Sobanski & Todd, LLC

(57) ABSTRACT

A joint yoke for a universal joint, as well as to a universal joint having the same. In such a universal joint, the two joke arms in the joint yoke are separated into a base portion having integrally arm portions and bridge elements. For attaching the bridge elements, headed screws are used, for which in the end faces of the arm portions threaded bores are arranged. The threaded bore which, when projected onto the bore axis 10 of the neighboring support bore, has the largest distance from the longitudinal axis 5 has a diameter remarkably increased compared to the other threaded bores 19, 20. Compared to embodiments in which several headed screws and corresponding threaded bores are provided, which have the same diameter, an above proportional increase of the torque transmission can be achieved.

11 Claims, 3 Drawing Sheets

JOINT YOKE AND UNIVERSAL JOINT COMPRISING THE SAME

BACKGROUND OF THE INVENTION

The invention relates to a joint yoke for a universal joint and also to a universal joint comprising the same.

U.S. Pat. No. 5,647,799 describes a universal joint having a joint yoke which comprises a longitudinal axis. The joint yoke comprises a base portion centered on the longitudinal axis, from which two yoke arms extend. These are arranged off-set in opposite directions from the longitudinal axis. Each yoke arm comprises a support bore. The support bores of both yoke arms are arranged on a common bore axis which extends at a right angle to the longitudinal axis. Each yoke arm has two arm portions which are formed integrally with the base portion and project therefrom. The two arm portions are separated by the support bore and have end faces distanced from the base portion. In each of these end faces, respectively, a threaded bore is arranged. Furthermore, each yoke arm comprises a bridge element which connects its two arm portions and has abutment faces formed in correspondence with the end faces and by which the bridge element abuts the two end faces of the arm portions and which bridge element is fastened by means of screws. For this, the bridge elements have respectively in the abutment faces a through bore, through which a threaded headed screw can be screwed into the threaded bore of the corresponding arm portion.

Such joint yokes and therefore, also universal joints, which have these joint yokes, are designed for a specific torque range. For high torques, as they for example are present in drives of rolling mills, bridge elements can be provided which are attached by more than one screw on the corresponding arm portion. The rotational diameter of such joint yokes is however limited, as in the assembled condition, only a small space is available. Because of this reason, as high as possible torque capacity has to be achieved. This means that for a joint yoke, as large as possible bearing bush has to be provided, because of which the support bore has to be formed correspondingly large. This means that the size of the bridge element, and, therefore, also the size of the end faces, are dependent on the one side on the size of the support bore and on the other side on the rotational diameter. Therefore, the connection between the bridge element and the arm portions are of special importance.

SUMMARY OF THE INVENTION

The invention has the object to provide a joint yoke which has a high torque capacity.

The object is solved according to the invention by a joint yoke for a universal joint comprising:

a longitudinal axis, a base portion, centered on the longitudinal axis, two yoke arms, off-set in opposite directions from the longitudinal axis, having, respectively, a support bore, wherein the support bores have a common bore axis, extending at a right angle to the longitudinal axis, having, respectively, two arm portions integral with the base portion, separated by the support bore and having end faces, distanced from the base portion, with at least two threaded bores, which centers, respectively projected onto the bore axis of the neighboring support bore, are arranged with different distances to the longitudinal axis, wherein the threaded bore, arranged with the largest distance to the longitudinal axis, has a larger diameter than the other threaded bores, having, respectively, a bridge portion, connecting the two arm portions and provided with abutment faces formed correspondingly to the end faces and in which through bores are arranged, which are formed and arranged in correspondence to the threaded bores, screws, serving for the attachment of the bridge elements on the arm portions of the yoke arms and adapted to the threaded bores and the through bores.

Advantageous in this embodiment is that the screws arranged, when projected onto the bore axis, furthest away from the longitudinal axis ensure that the torque capacity is remarkably increased compared to an arrangement in which the screws and, therefore, the threaded bores have the same diameter.

Another advantage is that because of the fact that the threaded bores are arranged in reference to the bore axis closer to the longitudinal axis, and, therefore, also the corresponding screws are formed smaller, the angularity of the two joint yokes of a universal joint towards each other can be increased. Thus, with the same layout, a larger bending angle can be achieved.

In a further embodiment of the invention, it is provided, that the end faces of the arm portions and the abutment faces of the bridge elements are provided with a toothing. Preferably, its teeth extend parallel to the bore axis. Because of this, the connection between the two arm portions via the bridge element is further improved, as the arm portion which, depending on the rotational direction, is not loaded is stronger involved in the transmission.

In the case that three threaded bores are provided, it is possible, to form two of the threaded bores with the same diameter, while the third threaded bore which is arranged, when projected onto the bore axis of the neighboring support bore, in the end face furthest away from the longitudinal axis, has a larger diameter. In case that three threaded bores are provided, then it is also possible to form all with different diameters. All three threaded bores can be arranged with different distances when projected onto the bore axis of the neighboring support bore to the longitudinal axis. In a further embodiment of the invention, it is provided that per end face, the threaded bore which has the largest diameter has the smallest distance to the bore axis.

Furthermore, the threaded bores provided per end face can be arranged all with different distances to the bore axis.

Preferably, the threaded bore which is arranged, when projected onto the bore axis of the neighboring support bore, with the largest distance to the longitudinal axis, is increased by 1% to 35% compared to the next smaller threaded bore, whereby an immense increase in the transmissibility can be achieved. When, for example, this threaded bore is increased in size by around 20% in diameter compared to the next smaller threaded bore, an increase in the torque capacity of more than 20% compared to an arrangement, in which all threaded bores of an end face have the same diameter, can be achieved.

The object according to the invention is also solved by a universal joint which comprises a first joint yoke, which is formed according to one or more of the features of the joint yoke according to the invention, a second joint yoke, and a journal cross connecting the first joint yoke and the second joint yoke.

Preferably, the second joint yoke is also formed like the first joint yoke according to the features of the joint yoke according to the invention.

BRIEF DESCRIPTION OF THE DRAWINGS

In the drawing one embodiment of the joint yoke and of a universal joint according to the invention are schematically represented.

DETAILED DESCRIPTION OF THE PREFERRED EMBODIMENT

Figure 1:
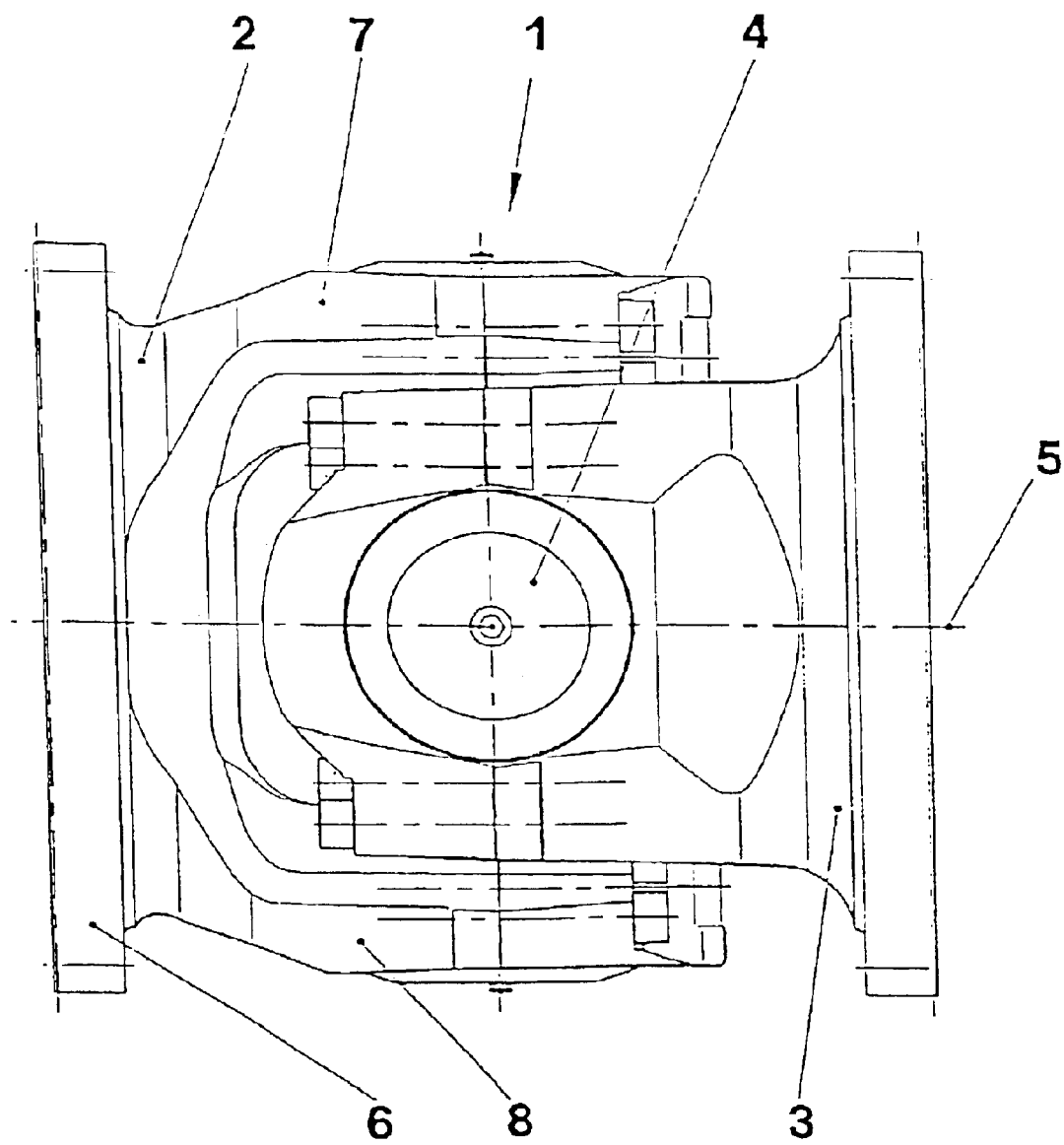
FIG. 1 is a side view of a universal joint with a joint yoke according to the invention.

FIG. 1 shows a universal joint 1 having the first joint yoke 2 and the second joint yoke 3, which are articulatably connected to each other by means of a journal cross 4. All components are shown centered on the longitudinal axis 5, which means that the first joint yoke 2 is not bent or angled in reference to the second joint yoke 3.

Both joint yokes 2, 3 can be formed in the same way. However, both may also differ in design. One of these joint yokes, namely the first joint yoke 2, is described in more detail concerning the embodiment in the following. It comprises a base portion 6, centered on the longitudinal axis 5, and two yoke arms, namely the first yoke arm 7 and the second yoke arm 8. Both are attached off-set in opposite direction to the longitudinal axis 5 on the base portion 6.

The first joint yoke 2 formed according to the invention is described by means of FIGS. 2 to 5.

Figure 2:
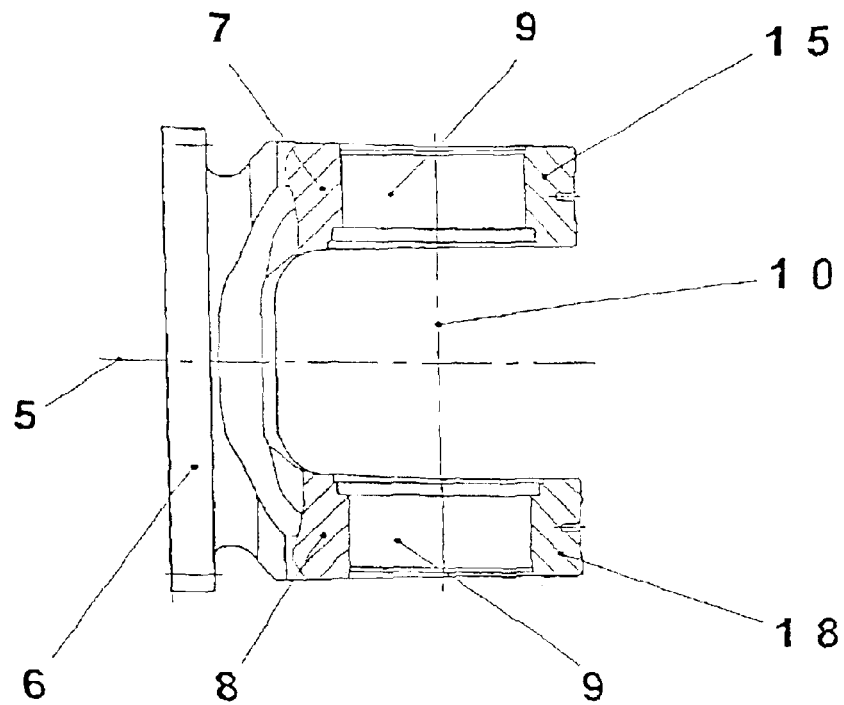
FIG. 2 shows a joint yoke according to the invention as an individual component, partially in sectional view.

The first joint yoke 2 comprises the first yoke arm 7 which, in the representation of FIG. 2, is arranged off-set towards the top from the longitudinal axis 5, and the second yoke arm 8 which, in FIG. 2, is arranged off-set towards the bottom from the longitudinal axis 5. The two yoke arms 7, 8 are formed the same. A support bore 9 extends through the two yoke arms 7, 8, respectively. Both support bores 9 are centered on the bore axis 10. The bore axis 10 extends at a right angle to the longitudinal axis 5. The two yoke arms 7, 8 are formed in the same way and are formed separately and comprise, respectively, two arm portions and a bridge element 15 and 18, respectively. The construction of a yoke arm, namely of the first yoke arm 7, will be described in detail. This description is also valid for the construction of the second yoke arm 8.

Figure 3:
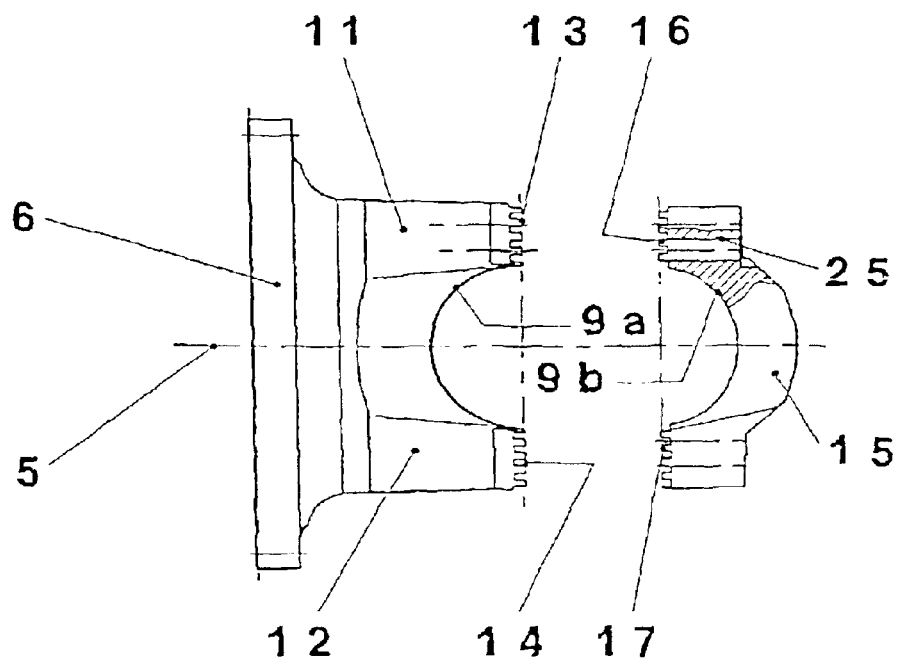
FIG. 3 shows a top view to FIG. 2, wherein, however, the bridge element is represented in a disassembled condition.

As it is especially visible from FIG. 3, the first yoke arm 7 comprises two arm portions, namely the first arm portion 11 and the second arm portion 12 distanced from the first arm portion, which are connected integrally to the base portion 6 of the first joint yoke 2. The two arm portions 11, 12 are separated from each other by means of the bore portion 9a of the support bore 9. They have end faces 13 or 14, respectively, distanced from the base portion 6, which, respectively, are provided with a toothing, which teeth extend preferably parallel to the bore axis 10 of the neighboring support bore 9. As the yoke arm 7 is split, a portion 9b of the support bore 9 forms part of the bridge element 15. The bridge element 15 has two abutment faces 16, 17, wherein the first abutment face 16 is formed in correspondence to the first end face 13 and the second abutment face 17 is formed in correspondence to the second end face 14.

Figure 5:
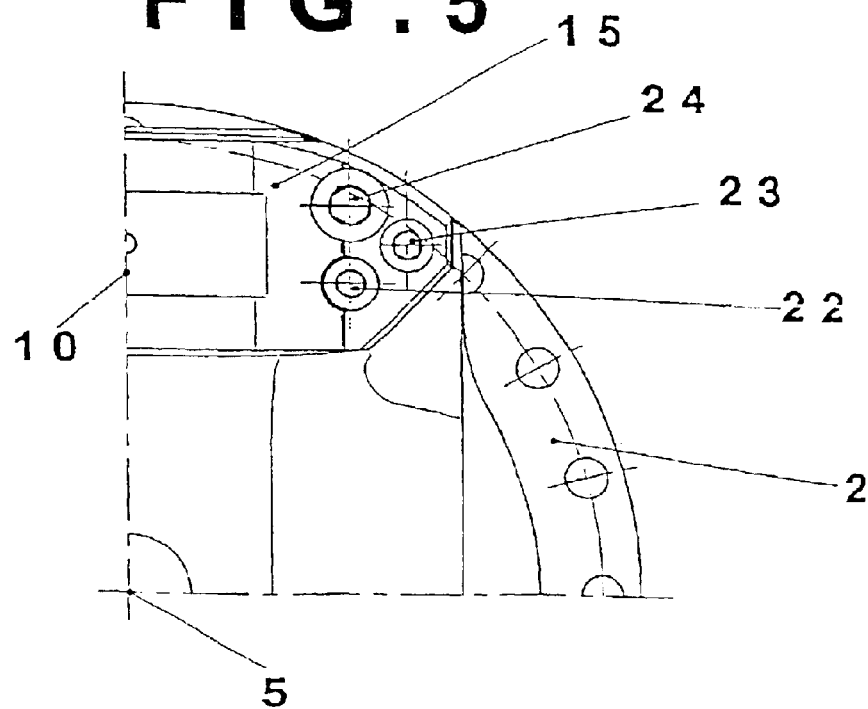
FIG. 5 shows a view corresponding to FIG. 4, however, with an assembled bridge element.

The toothings of both faces 13, 16 or 14, 17, respectively, form a pair and engage in each other, so that an interengaging connection between the bridge element 15 on the one side and the two arm portions 11, 12 on the other side is given. Additionally, it is provided that the bridge element 15 is connected in the area of the end faces 13, 14 or abutment faces 16, 17, respectively, to the arm portions 11 or 12, respectively, by means of screws. For this, in the bridge element 15 through bores are provided in the area of the abutment faces 16, 17. Although several headed screws are used for the connection, which are shown in FIG. 5 and are arranged as described in detail in the following, only one through bore 25 is visible in FIG. 3.

Figure 4:
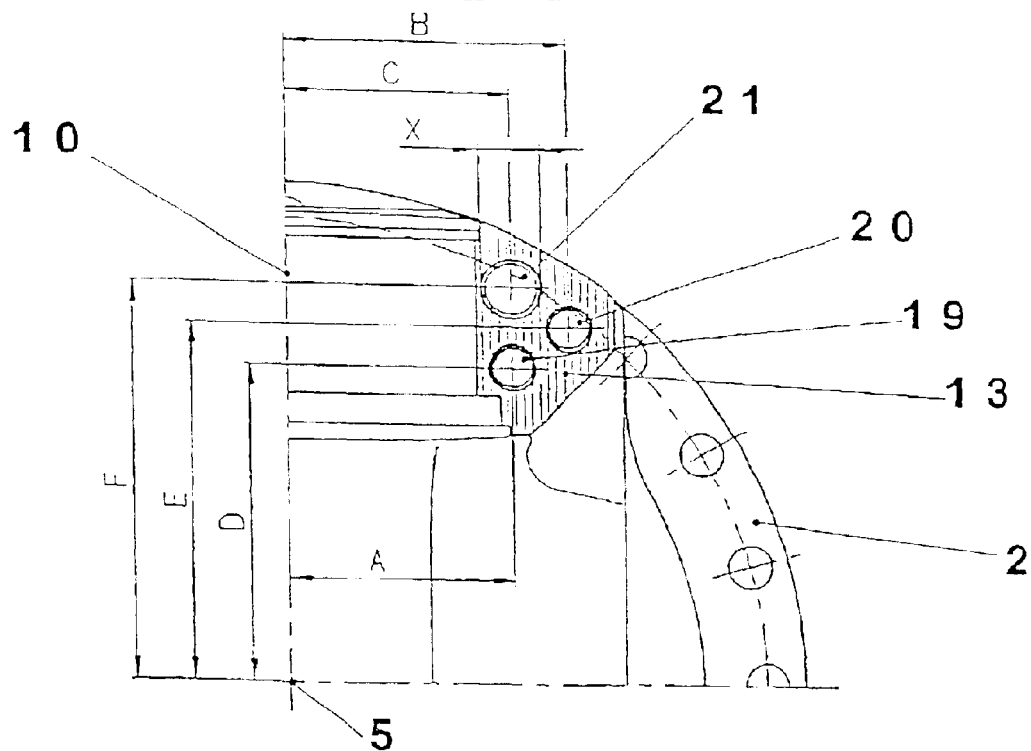
FIG. 4 shows a partial representation of the joint yoke of FIG. 3, with view onto an end face of the first yoke arm in an enlarged scale.

In FIG. 4, the arrangement and the layout of threaded bores 19, 20, 21 in reference to the first end face 13 are visible. The first threaded bore 19 is arranged in relationship to the bore axis 10 with the distance A and projected on the bore axis 10 of the neighboring support bore 9, in relationship to the longitudinal axis 5, with the distance D. The threaded bore 19 has a predetermined diameter. The second threaded bore 20 is arranged relative to the first threaded bore 19 in FIG. 4 with the distance E projected onto the longitudinal axis 5 and with the distance B in relationship to the bore axis 10. So, it is off-set to the first threaded bore 19. The third threaded bore 21 is arranged with a larger distance F, measured as a projection of its center onto the bore axis 10 of the neighboring support bore 9, to the longitudinal axis 5, compared to distances D and E. In relationship to the bore axis 10, the third threaded bore 21 is arranged with the distance C that can be the same as the distance A or different from the distance A, such as shown in FIG. 4. The third threaded bore 21 has also compared to the further threaded bores 19, 20 the largest distance to the longitudinal axis 5. Furthermore, its diameter X is also remarkably increased in relationship to the diameter of the other bores 19, 20 (in the size range between 1% and 35%, preferably 20%). On the corresponding abutment face 16, through bores are provided in correspondence to the arrangement of the threaded bores 19, 20, 21, which are adapted to the diameter of the screw to be inserted into the threaded bores 19, 20, 21, e.g. headed screws 22, 23, 24 according to FIG. 5. In FIG. 3, only the corresponding through bore 25 through the bridge element 15 in reference to the third threaded bore 21 in the bridge element 15 is visible. The headed screws 22, 23, 24 are inserted through the corresponding bores in the bridge element 15 into the threaded bores 19 or 20 or 21, respectively, wherein the headed screw 24 belongs to the through bore 25 in the bridge element 15 and to the largest threaded bore 21 in the first arm portion 11 and to its end face 13, respectively. In the represented embodiment, three threaded bores are provided for each end face. However, a larger number is also possible, wherein, however, the threaded bore arranged with the largest distance to the longitudinal axis 5 should also have the largest diameter. The other threaded bores can, respectively, have the same diameters, but also differently formed diameters are possible, as shown in FIG. 4. A compact design is especially achieved when the third threaded bore 21, having the largest diameter, is arranged compared to the other threaded bores 19, 20 closer to the bore axis 10 or at least with the threaded bore 19, which is arranged with the smallest distance to the longitudinal axis 5, are arranged in reference to their bore axis with the same distances to the bore axis 10. As far as in connection with the threaded bores 19, 20, 21, description has been made in reference to the distance to the bore axis 10 and longitudinal axis 5, respectively, the distances of the center or axis of these threaded bores 19, 20, 21, projected onto the bore axis 10 of the neighboring support bore 9, in reference to the longitudinal axis 5 and their distance to the bore axis 10 are meant. The description given for the end face 13 is also valid correspondingly for all end faces of the arm portions of the two yoke arms 7, 8 of the joint yoke.

What is claimed is:

1. A joint yoke for a universal joint comprising:

a longitudinal axis (5), a base portion (6) centered on the longitudinal axis, and two yoke arms (7, 8), off-set in opposite directions from the longitudinal axis (5), having, respectively, a support bore (9), wherein the support bores (9) have a common bore axis (10), extending at a right angle to the longitudinal axis (5), having, respectively, two arm portions (11, 12) integral with the base portion (6), separated by the support bore (9) and having end faces (13, 14), distanced from the base portion (6), with at least two threaded bores (19, 20, 21), which centers, respectively projected onto the bore axis (10) of the neighboring support bore (9), are arranged with different distances (D, E, F) to the longitudinal axis (5), wherein the threaded bore (21), arranged with the largest distance (F) to the longitudinal axis (5), has a larger diameter (X) than the other threaded bores (19, 20), having, respectively, a bridge portion (15, 18), connecting the two arm portions (11, 12) and provided with abutment faces (16, 17) formed correspondingly to the end faces (13, 14) and in which through bores (25) are arranged, which are formed and arranged in correspondence to the threaded bores (19, 20, 21), and screws (22, 23, 24) serving for the attachment of the bridge elements (15, 18) on the arm portions (11, 12) of the yoke arms (7, 8) and adapted to the threaded bores (19, 20, 21) and the through bores (25).

2. A joint yoke according to claim 1, characterized in that the end faces (13, 14) of the arm portions (11, 12) and the abutment faces (16, 17) of the bridge portions (15, 18) are provided with a toothing.

3. A joint yoke according to claim 2, characterized in that the teeth of the toothing extend parallel to the bore axis (10).

4. A joint yoke according to claim 1, characterized in that per end face (13, 14), three threaded bores (19, 20, 21) and per abutment face (16, 17) three through bores (25), which correspond to the three threaded bores, are provided, wherein the three threaded bores (19, 20, 21) are all arranged with different distances (D, E, F) to the longitudinal axis (5).

5. A joint yoke according to claim 4, characterized in that the three threaded bores (19, 20, 21) provided on each end face (13, 14) have all different diameters.

6. A joint yoke according to claim 1, characterized in that per end face (13, 14), the threaded bore (21) having the largest diameter (X), is provided at the smallest distance (C) to the bore axis (10).

7. A joint yoke according to claim 6, characterized in that the threaded bores (19, 20, 21) provided in each end face (13, 14) are all arranged with different distances (A, B, C) to the bore axis (10).

8. A joint yoke according to claim 1, characterized in that the threaded bore (21), arranged with the largest distance to the longitudinal axis (5), and the corresponding screw (24) are formed larger in the diameter by 1% through 35%, than the next smaller threaded bore (20) or screw (23), respectively.

9. A joint yoke according to claim 8, characterized in that the threaded bore (21), arranged with the largest distance to the longitudinal axis (5), and the corresponding screw (24) are formed larger in the diameter by approximately 20% than the next smaller threaded bore (20) or screw (23), respectively.

10. A universal joint comprising:

a first joint yoke (2) formed according to claim 1, a second joint yoke (3) and a journal cross (4) connecting the first joint yoke (2) and the second joint yoke (3).

11. A universal joint comprising:

a first joint yoke (2) and a second joint yoke (3), both said first joint yoke (2) and said second joint yoke (3) being formed according to claim 1, and a journal cross (4) connecting the first joint yoke (2) and the second joint yoke (3).

* * * * *